United States Patent [19]

Birkett

[11] Patent Number: 5,418,280
[45] Date of Patent: May 23, 1995

[54] DISPERSED PARTICULATE COMPOSITION

[75] Inventor: Kevin L. Birkett, Bury, England

[73] Assignee: Imperial Chemical Industries PLC, United Kingdom

[21] Appl. No.: 398,558

[22] Filed: Aug. 25, 1989

[30] Foreign Application Priority Data

Aug. 30, 1988 [GB] United Kingdom ............... 8820511

[51] Int. Cl.⁶ .......................... C08K 5/16; C08K 5/36
[52] U.S. Cl. .................................. 524/588; 524/425;
524/447; 524/423; 524/311; 524/238; 524/239;
524/242; 524/306; 524/394; 524/396; 524/400;
524/266; 524/268; 524/860; 524/863; 524/731;
524/788; 524/789; 264/331.11
[58] Field of Search ............... 524/425, 447, 423, 588,
524/210, 239, 238, 242, 306, 311, 394, 396, 400,
266, 268, 860, 863, 731, 788, 789; 264/331.11

[56] References Cited

U.S. PATENT DOCUMENTS 3,922,246 11/1975 Ceyzeriat et al. ............. 525/474
4,797,440 1/1989 Schofield et al. ............. 524/400
4,888,380 12/1989 Kamis et al. ................. 524/588

OTHER PUBLICATIONS

Noll, *Chemistry and Technology of Silicones* 1968 p. 480.

*Primary Examiner*—John C. Bleutge
*Assistant Examiner*—Margaret W. Glass
*Attorney, Agent, or Firm*—Paul L. Sharer

[57] ABSTRACT

A sealant or mastic composition comprises a dispersion of a finely divided particulate solid in a silicone resin formulation which contains a dispersant containing at least one group of the formula $$-(O-A-CO)_n-.$$

The dispersant may be derived from a hydroxycarboxylic acid and preferably has a —COOH end group. The dispersant modifies the shear properties of the sealant.

10 Claims, 1 Drawing Sheet

DISPERSED PARTICULATE COMPOSITION

This specification describes an invention relating to a sealant composition comprising a dispersion of a finely divided particulate solid in a silicone resin formulation in the presence of a dispersant.

THE COMPOSITION

According to the present invention there is provided a sealant or mastic composition comprising a dispersion of a finely divided particulate solid in a silicone resin formulation in the presence of a dispersant comprising et least one group of the formula:

$$—(O—A—CO)_n— \qquad \text{I}$$

wherein
- A is a divalent aliphatic radical containing from 8 to 35 carbon atoms and in which at least 4 of the carbon atoms are directly between the oxygen atom and the carbonyl group; and
- n is from 1 to 10.

It is preferred that the mean diameter of the particles of the finally divided particulate solid is below 100 microns, more preferably below 25 microns and especially below 10 microns.

The composition may contain from 1% to 90%, but preferably contains from 10% to 70%, and more preferably from 20% to 50%, by weight of the finely divided particulate solid. The composition may contain from 0.5% to 25%, but preferably contains from 0.5% to 10%, and more preferably from 1% to 10%, for example about 2%, by weight of the dispersant, based on weight of particulate solid.

The composition can be prepared by mixing the ingredients together in the desired proportions and subjecting them to any of the processes commonly used for dispersing particulate solids in resins. Types of equipment commonly used for this dispersion process include extruders, injection moulders, internal mixers, including Banbury mixers, Z-blade and sigma-blade mixers, and twin-roll mills. It is preferred to mix the diapersant thoroughly with the silicone resin formulation before the addition, and mixing in, of the finely divided particulate solid.

The composition may include other conventional ingredients such as crosslinking agents, chain extending agents, fungicides, bactericides, accelerators, anti-oxidants, anti-static agents, coupling agents, foaming agents, mould release agents, plasticisers, slip agents, UV stabilisers, viscosity modifiers, catalysts, pigments, etc.

The present composition has the unexpected property of having a lower viscosity than a conventional silicone-based sealant, which does not contain the previously defined diapersant, at higher rates of shear, but conversely a higher viscosity than a conventional silicone-based sealant at lower rates of shear. This means that curves of shear rate against viscosity for two sealant compositions, one with the dispersant and one without the diapersant, will intersect. The point of intersection in the curves of viscosity against shear rate for any composition in accordance with the present invention containing a diapersant as defined herein and a conventional composition not containing the diapersant will vary over a wide range of viscosity and shear rate according to the proportions and characteristics of the various ingredients.

The consequence of the intersection of the viscosity/shear rate curves is that the present composition can be made more workable during the application phase, when subjected to high shear, but, immediately after application, in the absence of high shear, effectively gels, so that it remains in the form in which it was applied.

THE SOLID

Figure 1:
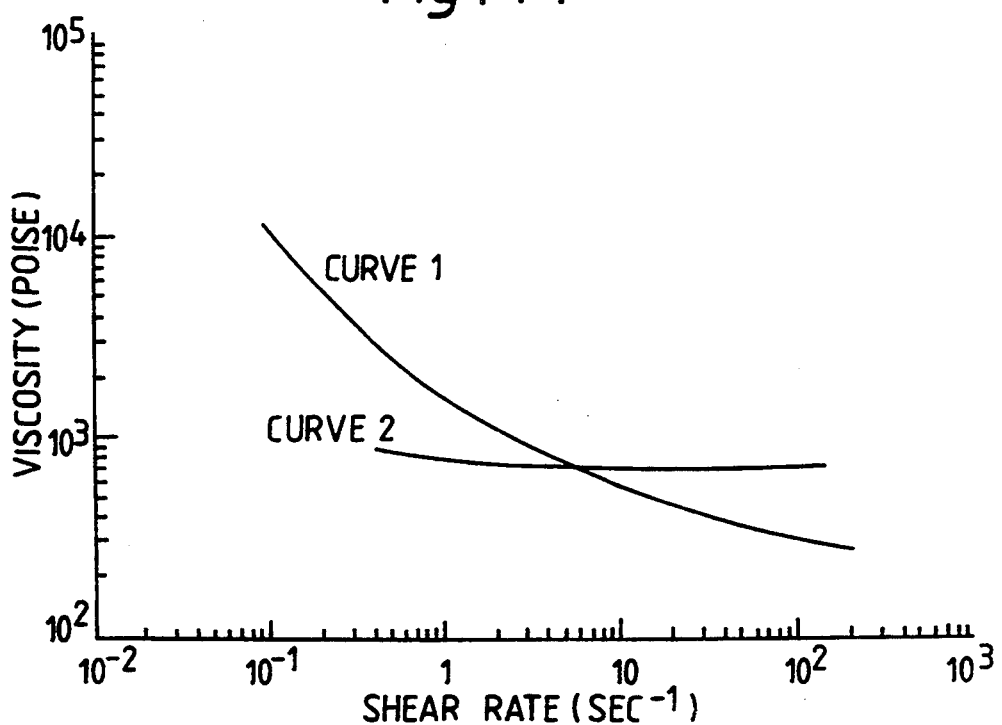
FIG. 1 shows a plot of the viscosity at various shear rates for Composition 1 of Example 1 (CURVE 1) and for a composition identical to Composition 1 except without dispersant (CURVE 2).

The solid may be any filler, extender, pigment or a combination of at least two thereof which it is desired to distribute and stabilise in a finely divided state in a silicone sealant formulation.

A preferred solid is a filler or extender, such as talc, kaolin, silica, calcium carbonate, barytes and chalk.

Suitable pigments are from any of the recognised classes of pigments described, for example, in the Third Edition of the Colours Index (1971) and subsequent revisions of, and supplements thereto, under the chapter headed "Pigments".

THE SILICONE RESIN FORMULATION

The silicone resin formulation contains a resin having siloxane groups, for example units of general formula II as hereinafter defined, as the repeating units. The silicone resin formulation may be a mixture of two or more silicone resins and preferably comprises a relatively high molecular weight cross-linkable polysiloxane ("Resin") plasticised with a low molecular weight fluid polysiloxane (Fluid).

The Resin preferably comprises a plurality of one or more units of the general formula II:—

$$\begin{array}{c} CH_3 \\ | \\ -Si-O- \\ | \\ X \end{array} \qquad \text{II}$$

wherein X is —CH$_3$, —CH$_2$CH$_3$, —CH=CH$_2$, or —C$_6$H$_5$, and the Resin has terminal hydroxy groups, so that it is cross-linkable. The Resin preferably comprises sufficient units of formula II to have a molecular weight from 10,000 to 500,000. The molecular weight of the Resin is typically such that the Resin has a viscosity in the range from 1000 cps to 100,000 cps. The Resin is preferably a homopolymer of dimethylsiloxane units, in which X is CH$_3$, but may also be a co-polymer containing units in which X is methyl and further units in which X is vinyl or phenyl.

The Fluid preferably comprises a plurality of units of the general formula II and has a viscosity in the range from 100 cps to 10,000 cps. The Fluid is preferably a homopolymer of dimethylsiloxane units and is preferably terminated by trimethylsilyl groups.

The silicone resin formulation preferably comprises a mixture of the Resin and Fluid in the weight ratio from 10.1 to 1.2, and more preferably in the weight ratio from 5:1 to 1:1.

THE DISPERSANT

One preferred dispersant is represented by the formula:

$$T-CO-[-O-A-CO-]_n-O^-J^+ \qquad \text{III}$$

wherein

A is as hereinbefore defined;
T is optionally substituted alkyl, alkenyl, cycloalkyl, polycycloalkyl, aryl or polyaryl;
n has a value from 1 to 10, preferably from 1 to 6. and
J is H, a metal, $NH_4$ or substituted ammonium;

Another preferred dispersant is represented by the formula:

$$T-CO-[-O-A-CO-]_n-R \qquad \text{IV}$$

wherein

A, T & n are as hereinbefore defined; and
R is group containing a nitrogen atom in the form of an amino group or an ammonium salt group.

The group:

$$T-CO-[-O-A-CO-]_n$$

present in Formulae III and IV is an ester group or oligo- or polyester chain and will hereinafter be referred to as the "Ester Group".

The precise structure of the chain terminating group T, is not critical provided it is inert to the other components of the composition under the normal processing conditions to which it is subjected. It is preferably free from ionic and strongly polar groups and preferably has a molecular weight of less than 300 and contains only C and H or C, H and O atoms.

Where the dispersant is prepared by the polyesterification of a hydroxyalkyl or hydroxyalkenyl carboxylic acid, HO—A—COOH, the terminating group, T, may be HO—A— or H—A— derivable from the acids themselves or from the non-hydroxyl alalogues which are generally present in commercial grades of such acids. However, T may be derived from any convenient acid added to the polyesterification reaction mixture, such as acetic acid, phenylacetic acid, lauric acid, benzoic acid, abietic acid etc as hereinafter described.

The group. T, is preferably alkyl or alkenyl containing up to 35 carbon atoms, especially from 7 to 25, and more especially from 7 to 20, carbon atoms, such as heptyl, octyl, undecyl, dodecyl, octadecyl, octadecenyl, octadecadienyl, heptadecyl, heptadecenyl, heptadecadienyl, or such a group substituted by a hydroxy, halo or alkoxy group, especially $C_{1-4}$-alkoxy, such as 12-hydroxyoctadecyl and 12-hydroxyoctadecenyl. The group T may alternatively be a $C_{4-8}$-cycloalkyl group such as cyclohexyl; a polycycloalkyl group, for example, a polycyclic terpenyl group which is derivable from naturally occurring acids such as abietic acid; an aryl group such as phenyl; an aralkyl group, such as benzyl, and a polyaryl group, such as naphthyl, biphenyl, stilbenyl and phenylmethylphenyl. Such groups are preferably unsubstituted or substituted by a group selected from hydroxy, halo and $C_{1-4}$-alkoxy.

The divalent aliphatic radical, A, preferably contains from 8 to 14 carbon atoms directly between the oxygen atom and the carbonyl group. It is especially preferred that A is an alkylene or an alkenylene group, such as;

$$CH_3-(CH_2)_5-\underset{\underset{H}{|}}{C}-(CH_2)_{10}-$$

or $$CH_3-(CH_2)_5-\underset{\underset{H}{|}}{C}-CH_2-CH=CH-(CH_2)_7-.$$

In Formula III, where J is a metal, preferred metals are alkali metals, especially sodium, potassium, and alkaline earth metals, especially calcium. Where J is a substituted ammonium group, preferred groups are those derived from alkylamines, such as octadecylamine, diethylamine and triethylamine; arylamines, such as aniline and toluidine; and oligo- and polyamines, especially oligo- and poly-$C_{2-4}$-alkyleneimines, such as ethylenediamine, diethylenetriamine, triethylenetetramine and polyethyleneimines. Where J is a an oligo or polyalkyeneimine, there are preferably at least two Ester Groups attached to each chain. Further details and examples of compounds of Formula III are given in GB 1,342,746 and GB 2,001,083.

In Formula IV, the group R is preferably attached to a carbonyl group in the Ester Group through an oxygen atom or a nitrogen atom (separate from the nitrogen atom in the amino or ammonium salt group) present in R so as to form an ester or amide link with the carbonyl group in the Ester Group. A preferred structure for R is:

$$X-G-Y$$

wherein

X is O or N—W
G is a divalent bridging group
W is an inert substituent and
Y is the amino or substituted ammonium salt group.

The amino or ammonium salt group, Y, is preferably of the formula:

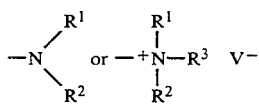

wherein $R^1$, $R^2$ and $R^3$ are each independently an aliphatic or alicyclic or arylaliphatic group containing up to 20 carbon atoms and $V^-$ is an anion. $R^1$ to $R^3$ are preferably $C_{1-20}$-alkyl, $C_{2-20}$-alkenyl, $C_{4-10}$-cycloalkyl or $C_{7-10}$-aralkyl. Alternatively the group Y may be an oligo- or poly-amine, especially from a poly-$C_{2-4}$-alkyleneimine or an immonium salt group derivable therefrom. Where Y is a polyamine it is preferably attached to two or more Ester Groups Suitable anions include those of inorganic and organic acids and the organic acids include coloured and colourless acids, although the anion is preferably not coloured unless the dispersant is required for the dispersion of a pigment in the composition. Examples of suitable compounds of Formula IV are given in GB 1,373,660 and GB 2,001,083.

The divalent bridging group, G, is any convenient group which will link the amino or ammonium salt group to the nitrogen or oxygen atom, X, and does not contain reactive groups or substituents which will interfere with the dispersing properties of the dispersant. Suitable groups include $C_{1-6}$-alkylene especially $C_{4-10}$-alkylene, $C_{2-6}$-alkenylene, phenylene, especially 1,4-phenylene, cyclohexylene, especially 1,4-cyclohexylene, which are preferably unsubstituted but may carry substituents, preferably selected from $C_{1-4}$-alkyl, $C_{1-4}$-alkoxy, hydroxy and halogen.

Where X is N—W, W is an inert substituent and is preferably selected from $C_{1-20}$-alkyl, monocyclic-aryl, especially phenyl, $C_{1-8}$-cycloalkyl, especially cyclohexyl and aralkyl, especially benzyl. Alternatively W, together with one of the substituent groups, $R^1$, on the amino group can form a second divalent linking group so that G, W and $R^1$ and the nitrogen atoms to which they are attached form a heterocyclic group:

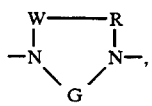

Where the optional substituent on the terminating group, T, is hydroxy, the diapersant may be prepared by polymerising a hydroxy-carboxylic acid, optionally followed by neutralisation with an appropriate base or reaction with an polyamine or aminol to form an ester or amide. Where T is unsubstituted, or carries a different substituent, the polymerisation may be modified by the inclusion of a chain terminating carboxylic acid of the formula:

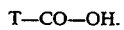

In any specific polymer chain present in the dispersant, n is an integer. However, as with most oligomeric and polymeric materials, the dispersant comprises polymer chains having different chain lengths, that is a mixture of materials of formulae III or IV, in which the value of n is different. Hence, in dispersants of the formulae III or IV the value of n is an average value and in general the average value of n is not integral.

The polymerisation process used to prepare the dispersant, may be performed by heating a suitable hydroxycarboxylic acid, optionally in the presence of a suitable chain terminating agent such as a non-hydroxyl substituted carboxylic acid, preferably in the presence of an esterification catalyst, such as tetrabutyl titanate, zirconium naphthenate, zinc acetate or toluene sulphonic acid, at a temperature from 150° C. to 250°C. The water formed in the esterification reaction is preferably removed from the reaction medium, and this can be conveniently done by passing a stream of nitrogen over the reaction mixture, or by carrying out the reaction in the presence of a solvent such as toluene or xylene, and distilling off the water as it is formed.

Where the diapersant is in the form of a metal salt it can be conveniently made by heating the product of the esterification reaction with an oxide, hydroxide or carbonate of the metal at a convenient temperature, for example between 150° C. and 250°C. Where the diapersant is an ammonium salt it can be conveniently made by heating the product of the esterification reaction with the appropriate amine at a convenient temperature, for example just above the melting point of the esterification reaction product. Such salts may also be made in situ during the grinding operation. Where the diapersant is an ester or amide (X is O or N—W in Formula IV) it may be formed by reaction of the polyamine or aminol with the product of the esterification reaction at a temperature, preferably from 150° C. to 250° C., which is such as to ensure formation of the ester or amide group. However, depending on the severity of the reaction conditions employed, the diapersant may comprise a mixture of compounds or Formulae III and IV.

The invention is further illustrated by the following examples in which all parts and percentages are by weight unless otherwise indicated.

Dispersant 1

A mixture of 1000 g of commercial grade 12-hydroxy stearic acid (HSA) and 1 g of tetrabutyl titanate was stirred under nitrogen for 16 hours at 170° C. to 180°C. The product was a viscous liquid with an acid value of 34 mg KOH/g. It therefore had a molecular weight of 1650 and the average value of n was 4.5.

Dispersant 2

A mixture of 100 g of stearic acid, 335 g of commercial grade 12-hydroxy stearic acid (HSA) and 0.9 g of tetrabutyl titanate was stirred under nitrogen at 170° C. to 180° C. for approximately 16 hours, when it had an acid value of 73 mg KOH/g. The product was a light brown and partly solidified at room temperature. It had a molecular weight of 768 and the average value of n was 1.6.

Dispersants 3 to 5

Table 1 lists a series of preparations carried out in the same manner as described for diapersant 2, but using the quantities of stearic acid (SA) and 12-hydroxy-stearic acid (HSA) indicated in Table 1 in place of the commercial grade HSA. The dispersants had the properties given in Table 1.

TABLE 1

| Dispersant No | Weight SA | Weight HSA | Acid Value (mg KOH/g) | Mol. Wt | Average value of n |
|---|---|---|---|---|---|
| 3 | 112 | 150 | 94.4 | 594 | 1.0 |
| 4 | 45 | 150 | 66.7 | 841 | 1.8 |
| 5 | 25 | 150 | 48.9 | 1147 | 2.87 |

Dispersant 6

A mixture of 1008 g of ricinoleic acid (NOUR Acid CS 80 from AKZO:NOUB is a trade mark), 43 g of oleic acid, and 0.3 g of tetrabutyl titanate was stirred under nitrogen at 170°–180° C. for approximately 16 hours, when it had an acid value of 76.7 mg KOH/g. The product was a light brown liquid with a molecular weight of 731, and the average value of n was 1.6.

Diapersant 7

A mixture of 10 g (0.0137 mols) of Dispersant 6 and 2.04 g (0.137 mols) of triethanolamine was heated to approximately 100° C. and then allowed to cool to room temperature.

Dispersant 8

A mixture of 300 g of commercial grade 12-hydroxystearic acid, 85 g of oleic acid and 0.8 g of tetrabutyl titanate was stirred under nitrogen at 170°–190° C. for approximately 10 hours, when it had an acid value of 73 mg.KOH/g. The product was a light brown liquid with a molecular weight of 768, and the average value of n was 1.7.

EXAMPLE 1

Composition 1 in accordance with the following recipe:

| Resin 1 | 45.5 g |
|---|---|
| Calcium carbonate | 25.0 g |
| Fluid 1 | 23.5 g |
| Dispersant 2 | 0.5 g |
| Total | 94.5 g | was prepared by mixing the ingredients together in Z-blade mixer (Beken) for 30 minutes until a homogeneous mixture was obtained, in which the calcium carbonate was evenly dispersed through the silcone materials.

Resin 1 is a hydroxy-terminated polydimethylsiloxane having a viscosity of 50,000 cps and average molecular weight of 85,000 (Polymer D, ICI)

Calcium Carbonate is WINNOFIL (ICI)

Fluid 1 a methyl-terminated polydimethylsiloxane having a viscosity of 1000 cps at 25° C. (F111/1000, ICI)

The viscosity of Composition 1 was measured at various shear rates and the results are shown as a plot of viscosity (in poise) against shear rate (in $sec^{-1}$) in FIG. 1 (Curve 1). FIG. 1 also shows a plot of viscosity against shear rate for a Composition 1C, which is identical to Composition 1 except for the omission of Dispersant 2 (Curve 2). FIG. 1 clearly shows the lower viscosity of Composition 1 at higher shear rates (above 10 $sec^{-1}$) and the higher viscosity of Composition 1 at lower shear rates (below 5 $sec^{-1}$).

EXAMPLE 2

Composition 2 in accordance with the following recipe:

| Resin 1 | 45.0 g |
|---|---|
| Calcium carbonate | 40.0 g |
| Fluid 1 | 15.0 g |
| Dispersant 2 | 0.8 g |
| Total | 100.8 g | was prepared by mixing the ingredients together in Z-blade mixer (Beken) for 30 minutes until a homogeneous mixture was obtained, in which the calcium carbonate was evenly dispersed through the silcone materials.

Figure 2:
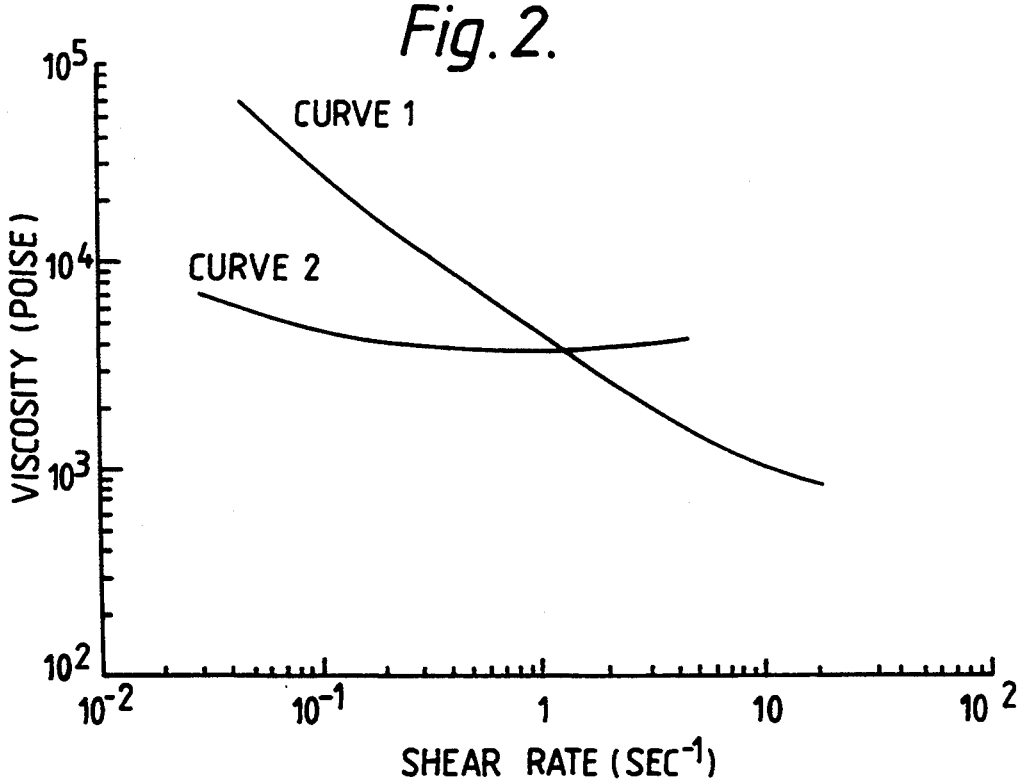
FIG. 2 shows a plot of the viscosity at various shear rates for Composition 2 of Example 2 (CURVE 1) and for a composition identical to Composition 2 except without dispersant (CURVE 2).

The viscosity of Composition 2 was measured at various shear rates and the results are shown as a plot of viscosity against shear rate in FIG. 2 (Curve 1). FIG. 2 also shows a plot of viscosity against shear rate for Composition 2C which is identical to Composition 2 except for the omission of Dispersant 2 (Curve 2). FIG. 2 clearly shows the lower viscosity of Composition 2 at higher shear rates (above 2 $sec^{-1}$) and the higher viscosity of the present composition at lower shear rates (below 1 $sec-1$).

EXAMPLE 3

Composition 3 in accordance with the following recipe

| Resin | 45.5 g |
|---|---|
| Calcium carbonate | 40.0 g |
| Fluid 1 | 10.0 g |
| Dispersant 2 | 1.0 g |
| TOTAL | 96.5 g | was prepared as described in Examples 1 and 2.

A plot of viscosity against shear rate for Composition 3 and a corresponding plot for a Composition 3C which is identical to Composition 3 except for the omission of Dispersant 2 showed a similar effect to that noted in Examples 1 and 2 with the cross-over point being at a shear rate of about 1 $sec^{-1}$.

I claim:

1. A sealant or mastic composition comprising a dispersion of a finely divided particulate solid which is a filler, extender or pigment in a silicone resin formulation in the presence of a dispersant comprising at least one group of the formula III or IV:

$$T-CO-[-O-A-CO-]_n-O^-J^+ \qquad III$$

$$T-CO-[-O-A-CO-]_n-R \qquad IV$$

wherein

A is a divalent aliphatic radical containing from 8 to 35 carbon atoms and in which at least 4 of the carbon atoms are directly between the oxygen atom and the carbonyl group;

T is a substituted or unsubstituted alkyl, substituted or unsubstituted alkenyl, substituted or unsubstituted cycloalkyl, substituted unsubstituted polycycloalkyl, substituted or unsubstituted aryl, or substituted or unsubstituted polyaryl;

J is H, a metal, $NH_4$ or substituted ammonium;

R is a group containing a nitrogen atom in the form of an amino group or an ammonium salt group; and n is from 1 to 10.

2. The composition of claim 1 which contains 1% to 90% by weight of the finely divided particulate solid and 0.5% to 25% by weight of the dispersant relative to the weight of the finely divided particulate solid.

3. The composition of claim 1 or wherein the finely divided particulate solid is a filler, extender or pigment or a combination of at least two thereof.

4. The composition of claim 1 wherein the silicone resin formulation comprises a cross-linkable polysiloxane having a plurality of one or more units of general formula II

and has terminal hydroxy groups and a viscosity in the range from 1000 cps to 100,000 cps plasticized with a fluid polysiloxane having a plurality of units of formula II and terminal trimethyl silyl groups and a viscosity in the range from 100 cps to 10,000 cps; wherein X is $-CH_3-$, $CH_2CH_3$, $-CH=CH_2$ or $-CH_6H_5$ 5. The composition of claim 4 wherein the cross-linkable polysiloxane and the fluid polysiloxane are in the weight ratio from 10:1 to 1:2.

6. The composition of claim 1 in which T is a group HO—A— or H—A—, where A is as defined in claim 1.

7. The composition of claim 6 in which the dispersant is a compound of formula III in which J is hydrogen.

8. A process for the preparation of a sealant or mastic composition which comprises mixing together a finely divided particulate solid which is a filler, extender or pigment, a silicone resin formulation and a dispersant comprising at least one group of the formula III or IV:

$$T-CO-[-O-A-CO-]_n-O^-J^+ \quad \quad III$$

$$T-CO-[-O-A-CO-]_n-R \quad \quad IV$$

wherein
- A is a divalent aliphatic radical containing from 8 to 35 carbon atoms and in which at least 4 of the carbon atoms are directly between the oxygen atom and the carbonyl group;
- T is a substituted or unsubstituted alkyl, substituted or unsubstituted alkenyl, substituted or unsubstituted cycloalkyl, substituted or unsubstituted polycycloalkyl, substituted or unsubstituted aryl, or substituted or unsubstituted polyaryl;
- J is H, a metal, $NH_4$ or substituted ammonium;
- R is a group containing a nitrogen atom in the form of an amino group or an ammonium salt group; and
- n is from 1 to 10;

wherein the ingredients are mixed together and the finely divided particulate solid is dispersed in the silicone resin formulation using an extruder, an injection moulder, an internal mixer or a twin-roll mill.

9. A sealant or mastic composition comprising a dispersion of a finely divided particulate solid, in which the mean diameter of the particles is less than 100 microns, in a silicone resin formulation in the presence of a dispersant comprising at least one group of the formula III or IV:

$$T-CO-[-O-A-CO-]_n-O^-J^+ \quad \quad III$$

$$T-CO-[-O-A-CO-]_n-R \quad \quad IV$$

wherein
- A is a divalent aliphatic radical containing from 8 to 35 carbon atoms and in which at least 4 of the carbon atoms are directly between the oxygen atom and the carbonyl group;
- T is a substituted or unsubstituted alkyl, substituted or unsubstituted alkenyl, substituted or unsubstituted cycloalkyl, substituted or unsubstituted polycycloalkyl, substituted or unsubstituted aryl, or substituted or unsubstituted polyaryl;
- J is H, a metal, $NH_4$ or substituted ammonium;
- R is a group containing a nitrogen atom in the form of an amino group or an ammonium salt group; and
- n is from 1 to 10.

10. A process for the preparation of a sealant or mastic composition comprising a dispersion of a finely divided particulate solid, in which the mean diameter of the particles is less than 100 microns, in a silicone resin formulation in the presence of a dispersant comprising at least one group of the formula III or IV:

$$T-CO-[-O-A-CO-]_n-O^-J^+ \quad \quad III$$

$$T-CO-[-O-A-CO-]_n-R \quad \quad IV$$

wherein
- A is a divalent aliphatic radical containing from 8 to 35 carbon atoms and in which at least 4 of the carbon atoms are directly between the oxygen atom and the carbonyl group;
- T is a substituted or unsubstituted alkyl, substituted or unsubstituted alkenyl, substituted or unsubstituted cycloalkyl, substituted or unsubstituted polycycloalkyl, substituted or unsubstituted aryl, or substituted or unsubstituted polyaryl;
- J is H, a metal, $NH_4$ or substituted ammonium;
- R is a group containing a nitrogen atom in the form of an amino group or an ammonium salt group; and
- n is from 1 to 10;

wherein the ingredients are mixed together and the finely divided particulate solid is dispersed in the silicone resin formulation using an extruder, an injection moulder, an internal mixer or a twin-roll mill.

* * * * *